United States Patent [19]
Hidler et al.

[11] 4,169,259
[45] Sep. 25, 1979

[54] FREQUENCY SENSITIVE SWITCHING CIRCUIT

[75] Inventors: Henry T. Hidler; John L. Plumb, both of Danvers, Mass.

[73] Assignee: GTE Sylvania Incorporated, Stamford, Conn.

[21] Appl. No.: 912,606

[22] Filed: Jun. 5, 1978

[51] Int. Cl.² .................. H04Q 9/10; H05B 41/23
[52] U.S. Cl. .................. 340/310 R; 340/171 R; 315/294; 315/315; 315/DIG. 7
[58] Field of Search .......... 340/310 R, 310 A, 171 R; 315/DIG. 5, DIG. 7, 315, 294, 200 A, 195

[56] References Cited
U.S. PATENT DOCUMENTS

| | | | |
|---|---|---|---|
| 3,898,553 | 8/1975 | Boggett | 315/200 A |
| 3,919,596 | 11/1975 | Bellis | 315/315 |
| 3,971,010 | 7/1976 | Foehn | 340/310 R |
| 4,134,043 | 1/1979 | Nuver | 315/DIG. 5 |

Primary Examiner—Donald J. Yusko
Attorney, Agent, or Firm—Edward J. Coleman

[57] ABSTRACT

A switching circuit for energizing a load, such as fluorescent lamp ballasts, in response to a control signal of preselected frequency superimposed on AC power circuits which supply the load. A triac is gated to conduct the AC power to the load by a circuit including an impedance element and a series resonant LC network tuned to the frequency of the control signal. The gate circuit is arranged to block the control signal during all but a small portion of each half cycle of the applied AC power, thereby reducing the consumption of control signal power.

8 Claims, 1 Drawing Figure

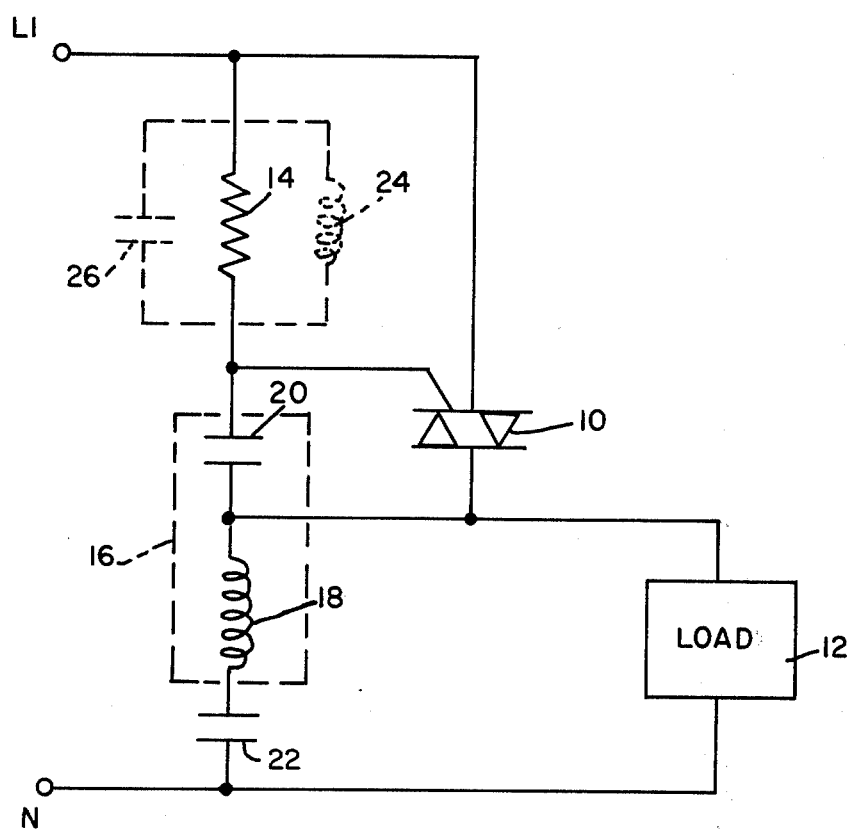

FREQUENCY SENSITIVE SWITCHING CIRCUIT

CROSS-REFERENCE TO RELATED PATENT

U.S. Pat. No. 3,971,010, issued July 20, 1976, Robert C. Foehn, "Ballasted Load Control System And Method".

BACKGROUND OF THE INVENTION

This invention relates generally to electrical control circuits and, more particularly, to an improved frequency sensitive switching circuit for controlling the energization of loads such as ballasted fluorescent and high intensity discharge lamps.

The above-referenced Foehn patent describes a load control system particularly useful for selectively controlling banks of ballasted lamps in a manner facilitating the implementation of energy conservation measures. More specifically, the system permits the ballasted loads to be selectively disconnected from a power circuit without disturbing other loads connected to the circuit and without substantial modification of existing wiring. Control signals having respective preselected frequencies are applied to the power circuit conductors at a convenient location remotely of the loads. Frequency sensitive switching circuits connect the loads to the conductors, and these switching circuits are actuated in response to the control signals to energize only the desired loads.

Briefly, each of the frequency sensitive switching circuits used in this system comprises a solid state switching device, such as a triac, having first and second main terminals and a control gate for controlling the conductance between the terminals. The first main terminal of the triac is connected to one of the AC power circuit conductors which supply power to the load, while the second main terminal is connected to one side of the load, the other side of the load being connected to the neutral conductor of the AC power circuit. An impedance element, such as a resistor or a parallel resonant circuit, is connected between the control gate and the first main terminal of th triac, and a series resonant circuit adapted to pass the control signal and block the operating power is connected between the control gate and the neutral AC power conductor.

In the absence of a control signal having a frequency at which the series resonant LC circuit is tuned, the gate circuit will not be activated and the triac remains non-conducting. Hence, if the load comprises one or more ballasted fluorescent lamps, the section of light system controlled by this triac switching circuit will remain turned off. In order to energize this section of the lighting system, a remotely located frequency generator is activated to superimpose on the power line conductors a control signal having a frequency matching that to which the above-mentioned LC resonant circuit is tuned. Since the series resonant circuit will pass the control signal, the full control signal appears across the gate connected impedance element, causing the triac to turn on and energize the load. In order to keep the triac conducting and maintain energization of the load, the gate circuit of this prior art frequency sensitive switch must be continuously activated by the control signal. Once the control signal is terminated, the triac will be turned off, and the load will be deenergized. Hence, although the load control system of the aforementioned Foehn patent represents a significant advance in the art with respect to energy conservation, the advantages of the system could be significantly enhanced if it was not necessary to continuously consume a signal power in order to maintain load energization.

SUMMARY OF THE INVENTION

Accordingly, it is an object of the present invention to provide an improved frequency sensitive switching circuit for controlling load energization.

It is a particular object of the invention to provide a frequency sensitive switching circuit which significantly reduces the consumption of control signal power.

It is a further object to provide a frequency sensitive switching circuit which is modified to conserve control signal energy in a manner which is comparatively simple and economical to implement.

These and other objects, advantages and features are attained, in accordance with the principles of the present invention, by modifying the described switching circuit of the Foehn patent as follows. The junction of the capacitor and inductor of the series resonant circuit is connected to the triac terminal which is coupled to the load. Further, an additional series capacitor is connected between the resonant circuit inductor and the neutral power circuit conductor. The capacitance value of this additional series capacitor is selected to block the operating power and pass the control signal having a frequency matching that at which the series resonant circuit is tuned. As a result of this circuit modification, the transmitted control signal is developed across the gate impedance means to actuate the triac into conduction at the end of each half each cycle of operating power. The resulting conduction of operating power through the switching device is then operative to effectively short out the capacitor component of the series resonant circuit and thereby cause the inductor component of the resonant circuit to block the control signal for the remainder of the operating power half cycle. Hence, the control signal is blocked during all but a small portion of each half cycle of the applied AC power, thereby significantly reducing the consumption of control signal power.

BRIEF DESCRIPTION OF THE DRAWING

This invention will be more fully described hereinafter in conjunction with the accompanying drawing, the single FIGURE of which is a circuit diagram of a frequency sensitive switching circuit according to the invention.

DESCRIPTION OF PREFERRED EMBODIMENT

The aforementioned U.S. Pat. No. 3,971,010, Foehn is hereby incorporated herein by reference. As discussed above, this patent describes a load control system including a plurality of control signal sources for selectively imposing control signals of respective preselected frequencies on AC power circuit conductors for controlling the energization of a plurality of ballasted loads such as fluorescent lights. As the interface between each of the loads to be selectively controlled and the AC power line conductors is a frequency sensitive switching circuit. The present invention describes an improved frequency sensitive switching circuit that may be directly substituted for each switching circuit of the control system described in the Foehn patent.

In the Foehn patent, the overall control system is illustrated in connection with a conventional three phase, four wire power distribution system of the type which is widely used in existing buildings. This system includes phase conductors and a neutral conductor which supply AC power to the building from an external source, typically at a line frequency of 60 Hz of an r.m.s. voltage of up to 600 volts between each of the phase conductors and the neutral conductor. Within the building, power is supplied to the various branch circuits by line conductors (denoted in the patent as L1, L2, L3) and a neutral conductor (denoted in the patent as N) connected to the main phase and neutral conductors at a distribution panel. The system further includes means for applying control signals of predetermined frequency to the conductors of the branch circuits. The specific embodiment illustrated in the patent is a two channel system having respective control signal sources each operating at a different frequency. Each control signal source includes a frequency generator which operates at a given frequency, preferably in the range of 30 to 70 KHz, although control signal frequencies as low as 20 KHz and a high as 90 KHz are contemplated.

Referring to the drawing, the frequency sensitive switching circuit according to the invention includes a bidirectional switching device, such as a triac 10, having a first main terminal connected to the circuit input terminal denoted L1, a second main terminal connected to one side of the load 12, and a control gate for controlling conductivity between the terminals. The input terminal L1 represents circuit means connected to one of the 60 Hz AC line conductors. A second circuit input terminal, denoted as N, is connected to the other side of load 12 and represents means connected to the neutral conductor of 60 Hz power source. An impedance means, such as resistor 14, is connected between the control gate and the first main terminal of triac 10, and a series resonant circit 16 is coupled between the triac control gate and the neutral conductor terminals N. Resonant circit 16 in a series LC network comprising an inductor 18 and a capacitor 20, the capacitor being connected between one side of the inductor and the control gate of triac 10. The values of the LC components 18 and 20 are selected to provide a circuit tuned to resonance at the frequency of a selected one of the previously mentioned control signals which can be superimposed on the 60 Hz power line conductors.

In accordance with the invention, the other side of the inductor 18 is coupled to the neutral conductor terminal N through a capacitor 22 which has a capacitance value selected to block the 60 Hz operating power but pass the respective control signal for which circuit 16 is tuned to resonance. Further, according to the invention, the junction of the resonant circuit capacitor 20 and inductor 18 is connected to the second main terminal of the triac 10 which is connected to one side of the load 12.

For purposes of discussion, load 12 will be considered as a lamp ballast. Initially, it is assumed that the line conductors, such as L1, are energized with 60 Hz power, and that either there are no control signal superimposed on the line, or any control signals being generated are those having frequencies different from the frequency at which resonant circuit 16 is tuned. Under these conditions, resonant circuit 16 functions to block the 60 Hz operating power, whereupon triac 10 will remain turned off, and load 12 will remain deenergized.

If control signal having a frequency corresponding to the tuned resonance of the circuit 16 is applied to line conductor L1, the series circuit 16 and capacitor 22 pass the signal, and the full control signal appears across resistor 14. As a result of the voltage developed on the control gate circuit, triac 10 is caused to turn on and provide full conduction of the 60 Hz operating power to energize load 12. In addition, however, the conducting triac 10 also bypasses the control signal to the junction of inductor 18 and capacitor 20, thereby effectively shorting out capacitor 20 so that circuit 16 no longer resonates at the control signal frequency. Under these conditions, inductor 18 functions as a high impedance to block the control signal. In addition, as previously mentioned, the series capacitor 22 function to block the 60 Hz operating power when the triac is conducting. When the operating power, and hence the load current, returns to zero at the end of every half cycle of 60 Hz line current, the bypass action of the triac ceases, whereupon capacitor 20 again resonates with inductor 18 at the control signal frequency to permit a voltage build-up across resistor 14. Nearly the full control signal voltage appears across resistor 14. This same voltage appears between the triac control gate and the triac electrode terminal connected to L1, thereby actuating triac 10 into conduction to continue energization of load 12 and again short out capacitor 20 for the remainder of the half cycle of line current.

In summary, the frequency sensitive switching circuit of the invention accepts the control signal from the line conductor only long enough to retrigger the triac at the beginning of every half cycle of 60 Hz operating power applied through the triac switch to the load 12. Stated another way, the control signal is developed across resistor 14 and applied to the gate of triac 10 to actuate the same into conduction at the end of each half cycle of operating power, and thereafter the conduction of 60 Hz operating power through the triac is operative to effectively short out capacitor 20 to cause inductor 18 to block the control signal for the remainder of the 60 Hz operating power half cycle. Hence, signal power is drawn from the line for only a small fraction of the total time the signal is transmitted, thereby reducing the consumption of control power to a minimum.

The selectively of the frequency sensitive switching circuit can be improved by connecting a parallel resonant circuit between the triac control electrode and the terminal of the triac connected to L1, in lieu of the single resistor 14. This may be accomplished, as illustrated by dashed lines in the drawing, by connecting an inductor 24 and a capacitor 26 in parallel across the resistor 14. This parallel resonant circuit is tuned to resonance at the desired control signal frequency, that is, the same frequency at which the series resonant circuit is tuned.

Assuming preselected values for inductor 18 and capacitor 22, the illustrated switching circuit can be made to operate at various control signal frequencies by using various capacitance values for capacitor 20. The required signal voltage levels are determined by the choice of resistance for resistor 14.

Although the described circuit can be made using component values in ranges suitable for each particular application, as is well known in the art, the following table lists components values and types for a frequency sensitive switching circuit made in accordance with the present invention. More specifically, the table below provides a circuit for energizing arc lamp ballasts with an operating voltage of 277 volts of 60 Hz in response to a control signal of 10 volts at 32 KHz.

| | |
|---|---|
| Triac | Hutson Type T106M1SG |
| Resistor 14 | 100 ohms, ¼ watt |
| Inductor 18 | 4.3 millihenries |
| Capacitor 20 | 0.008 microfarad, 600 volts |
| Capacitor 22 | 0.022 microfarad, 600 volts |

A second implementation of the circuit for responding to a 51 KHz control signal comprises the same component values given above with the exception of capacitor 20, which has a value of 0.0025 microfarad, 600 volts.

In the specific embodiments described, the switching circuit consumes signal power for only about 1/80th of each half cycle period of the line current waveform, i.e., signal power is consumed after the waveform zero crossing for a period of about 100 microseconds during each half cycle period of about 8 milliseconds of the 60 Hz current being conducted through triac 10 to the load 12.

Although the invention has been described with respect to specific embodiments, it will be appreciated that modifications and changes may be made by those skilled in the art without departing from the true spirit and scope of the invention.

What we claim is:

1. A frequncy sensitive switching circuit for controlling the energization of a load in response to a control signal imposed on power circuit conductors carrying operating power for the load, said control signal having a first frequency and said operating power being alternating current of a second frequency, said switching circuit comprising:

a bidirectional switching device having first and second main terminals and a control gate for controlling conductance between the terminals;

means for connecting the first main terminal of said switching device to a first one of said power circuit conductors, and means for connecting the second main terminal of said switching device to one side of said load;

an impedance means connected between the control gate and the first main terminal of said switching device;

a series resonant circuit tuned to pass the control signal and block the operating power and comprising a first capacitor means and inductor means, said first capacitor means being connected between the control gate of said switching device and one side of said inductor means;

means connecting the junction of said first capacitor means and said inductor means to the second main terminal of said switching device;

a second capacitor means having one terminal connected to a second side of said inductor means and having a capacitance value selected to pass the control signal and block the operating power;

and means for connecting a second terminal of said second capacitor means to both a second side of said load and a second one of said power circuit conductors, whereby said impedance means, first capacitor means, inductor means and second capacitor means are serially connected in that order across said first and second power conductors.

2. The circuit of claim 1 wherein said first frequency is in the range of about 20 KHz to 90 KHz, and said series resonant circuit is tuned to resonance at said first frequency, said control signal being developed across said impedance means and applied to the gate of said switching device to activate the same into conduction at the end of each half cycle of operating power, and the conduction of operating power through said switching device being operative to effectively short out said first capacitor means and cause said first inductor means to block said control signal for the remainder of the operating power half cycle, thereby reducing the consumption of control signal power.

3. The switching circuit of claim 2 wherein said first frequency is in the range of 30 KHz to 70 KHz.

4. The circuit of claim 3 wherein said second frequency is about 60 Hz.

5. The circuit of claim 1 wherein said switching device is a triac.

6. The circuit of claim 1 wherein said impedance means is a resistor.

7. The circuit of claim 1 wherein said impedance means comprises a parallel resonant circuit tuned to resonance at said first frequency.

8. The circuit of claim 1 wherein said load comprises a ballasted arc discharge lamp.

* * * * *